(12) United States Patent
Sanders

(10) Patent No.: US 6,802,553 B1
(45) Date of Patent: Oct. 12, 2004

(54) FLORAL CARRIER FOR TRUCK BED

(76) Inventor: Virgil L. Sanders, 4142 Government Blvd., Mobile, AL (US) 36693

(*) Notice: Subject to any disclaimer, the term of this patent is extended or adjusted under 35 U.S.C. 154(b) by 0 days.

(21) Appl. No.: 10/638,015

(22) Filed: Aug. 8, 2003

(51) Int. Cl.[7] ................................................. B60J 7/02
(52) U.S. Cl. ........................ 296/100.09; 296/136.03; 296/16; 224/403; 224/502; 224/524; 224/534
(58) Field of Search ........................... 296/16, 3, 37.6, 296/37.7, 100.01, 100.02, 100.06, 100.07, 100.09, 136.01, 136.03, 136.04; 410/96, 101, 106, 110; 224/400, 401, 402, 403, 488, 495, 499, 502, 511, 522–524, 527, 533, 534; 206/423; 47/84

(56) References Cited

U.S. PATENT DOCUMENTS

| | | | | |
|---|---|---|---|---|
| 2,909,388 A | * | 10/1959 | Reilly | 296/21 |
| 2,964,349 A | * | 12/1960 | Picking, Jr. et al. | 296/16 |
| 4,936,724 A | * | 6/1990 | Dutton | 410/110 |
| 5,340,188 A | * | 8/1994 | Goble | 296/100.06 |
| 5,857,729 A | * | 1/1999 | Bogard | 296/100.09 |
| 6,227,602 B1 | * | 5/2001 | Bogard | 296/100.06 |
| 6,283,526 B1 | * | 9/2001 | Keough et al. | 296/26.09 |
| 6,299,232 B1 | * | 10/2001 | Davis | 296/100.07 |
| 6,338,520 B2 | * | 1/2002 | Rusu et al. | 296/100.07 |
| 6,352,296 B1 | * | 3/2002 | Kooiker | 296/100.06 |
| 6,382,699 B1 | * | 5/2002 | Hanson | 296/100.09 |

* cited by examiner

*Primary Examiner*—Patricia L. Engle

(57) ABSTRACT

The floral carrier for truck bed is a hollow truck bed cover having a front section and a rear section capable of rotating upward and towards the front section to provide access to the storage area formed by the cover. The rear section of the cover would angle rearward and slightly upward from the front section of the cover. A hand grasp extending from the rear section would facilitate its upwards rotation. The cover would feature multiple low profile bars along the tops of both sections and to which floral arrangements could be attached. The cover would be attached to the truck bed with a set of clips formed to interact with existing hardware in the bed of a pickup truck.

10 Claims, 3 Drawing Sheets

1

FLORAL CARRIER FOR TRUCK BED

BACKGROUND OF THE INVENTION

1. Field of the Invention

The present invention relates to an accessory for a truck bed for use in connection with transporting floral arrangements and potted plants, especially those associated with a funeral. The floral carrier for truck bed has particular utility in connection with providing an efficient and practical means for funeral directors to transport floral arrangements from the funeral home to the cemetery while providing a professional and attractive display for the funeral procession.

2. Description of the Prior Art

In a funeral procession, the floral arrangements and the casket are typically carried in separate vehicles, with one vehicle designated a floral car whereupon the floral arrangements are artistically displayed for the funeral procession. This requires the use of multiple vehicles and can add expense to the funeral arrangements and complexity to the funeral scheduling process. Additionally, the floral cars are expensive specialty vehicles that are typically only be used for that purpose. The use of other vehicles not intended as floral cars can lead to the loss of floral arrangements if they fall off the vehicle and to damage of potted plants and to the interior of the vehicle if the plants tip over in the vehicle. When the floral arrangements and potted plants are transported with the casket in the rear of a hearse, they can stain or further damage the interior of the hearse and the casket, as well as become bruised or damaged themselves. In addition, any onlookers are prevented from viewing the floral arrangements.

The use of specialty truck bed accessories is known in the prior art. For example, U.S. Pat. No. 2,964,349 to Howard M. Picking, Jr. discloses a modified undertaker's vehicle that provides an opening into which a casket can be inserted wherein the opening is covered by a grid structure to which floral arrangements can be secured. However, the Picking, Jr. '349 patent fails to provide a protected area for the transport of potted plants. If the casket area is used for potted plants, a second vehicle would be needed to transport the casket. Furthermore, the Picking, Jr. '349 patent requires the purchase of a hearse-type vehicle which could be quite costly since it is a specialty vehicle. Finally, in the event that all such vehicles were either nonfunctional or unavailable, the Picking, Jr. '349 device could not be used with a conventional pick-up truck for allowing an appealing means of transporting floral arrangements in a funeral procession.

U.S. Pat. No. 5,882,058 to Robert B. Karrer discloses a modular cargo anchoring and protection system for pickup trucks that includes a pair of extruded anchor rails, a bed liner, a universal anchor beam, a cab guard, a cargo bed enclosure cover, and a rear bumper. The components could be used individually or in varying combinations for the maximum effectiveness in achieving the desired cargo storage option. However, the Karrer '058 patent fails to provide a means for decoratively arranging and securing floral arrangements to the cargo bed cover for use in displaying the arrangements for a funeral procession In addition, the multiple components of the Karrer '058 system would not only increase the cost to the consumer, but would also increase the complexity and tediousness of the installation.

Similarly, U.S. Pat. No. Des. 327,462 to Gerald Dingman discloses the ornamental design for a removable vehicle top that provides a horizontal ladder structure along each side of its top and could be placed over a truck bed to protect items stored underneath it. The cover would be affixed to a vehicle by a strap extending from each corner. However, the Dingman '462 cover does not provide easy access to items stored beneath it, instead requiring that the cover be removed to access these items. This would be a cumbersome process if plants were stored beneath the cover for a funeral procession. In addition, the ladder structures along the sides of the Dingman '462 cover are not sufficient for adequately displaying floral arrangements on the cover for a funeral procession. Finally, the Dingman '462 cover would be cumbersome and tedious to secure or remove from the vehicle since the straps would need to be inserted through an opening in the vehicle and then tied or secured in some other manner.

U.S. Pat. No. 4,695,087 to J. Richard Hollrock discloses a convertible truck bed for pickups that consists of an adjustable framework for providing a substantially larger bed frame to be placed on the existing bed frame for transporting oversized items. However, the Hollrock '087 patent makes no provision for providing a covered space sufficiently sized to transport potted plants in the bed of the truck. Furthermore, the Hollrock '087 device fails to provide a means by which floral arrangements could be secured to the truck bed to form an attractive display for a vehicle in a funeral procession.

Lastly, U.S. Pat. No. 5,423,587 to Brian L. Ingram discloses a combination camper shell and lumber rack for pickup trucks. The invention consists of a flexible covering mounted on a framework with cross members on the top that is secured to the truck bed wherein the framework is used as a lumber rack when the covering is not installed. However, the Ingram '587 patent does not provide a protected space within the bed of the truck while the cross members are available for use. Therefore, floral arrangements could not be secured to the cross members while potted plants were stowed underneath the cover. Additionally, the vertical height of the framework of the Ingram '587 device allows for the top of the structure to extend over the cab of the pickup. Unfortunately, this would prevent mourners and onlookers from having a view of any floral arrangements attached to the cross members.

While the above-described devices fulfill their respective, particular objectives and requirements, the aforementioned patents do not describe a floral carrier for truck bed that allows funeral directors to transport floral arrangements from the funeral home to the cemetery in a professional and attractive way for the funeral procession. The Picking, Jr. '349 and Hollrock '087 patents fail to provide a protected area for the transport of potted plants, while the Ingrain '587 patent does not provide a protected space within the bed of the truck while the cross members are available for use. Additionally, the Dingman '462 device does not provide easy access to items stored beneath it, instead requiring that the cover be removed to access these items. This would be a cumbersome process if plants were stored beneath the cover for a funeral procession. Moreover, the Picking, Jr. '349 patent requires the purchase of a hearse-type vehicle which could be quite costly due to its specialty nature. If all such vehicles were either nonfunctional car unavailable, the Picking, Jr. '349 device is not portable to another vehicle. In addition, the Karrer '058 and Hollrock '087 patents fail to provide a means for decoratively arranging and securing floral arrangements for use in displaying the arrangements in a funeral procession. Furthermore, floral arrangements could not be secured to the cross members of the Ingram '587 while potted plants were stowed underneath the cover, and the ladder structures along the sides of the Dingman '462 cover are not sufficient for adequately displaying floral arrangements on the cover for a funeral procession. The cover of the Dingman '462 device would also be cumbersome and tedious to secure or remove from the vehicle since the straps would need to lie inserted through an opening in the vehicle and then tied or secured in some other manner. Finally, the vertical height of the framework of the Ingram '587 device allows for the top of the structure to extend over the cab of the pickup. Unfortunately, this would prevent mourners and onlookers from having a view of any floral arrangements attached to the cross members.

Therefore, a need exists for a new and improved floral carrier for truck bed that can be used for preventing damage to a casket or the interior of a hearse while providing a means for attractively displaying and transporting floral arrangements and potted plants in a funeral procession. In this regard, the present invention substantially fulfills this need. In this respect, the floral carrier for truck bed according to the present invention substantially departs from the conventional concepts and designs of the prior art, and in doing so provides an apparatus primarily developed for the purpose of providing a means for funeral directors to transport floral arrangements from the funeral home to the cemetery while providing a professional and attractive display for the funeral procession.

SUMMARY OF THE INVENTION

In view of the foregoing disadvantages inherent in the known types of specialty truck bed accessories now present in the prior art, the present invention provides an improved floral carrier for truck bed, and overcomes the above-mentioned disadvantages and drawbacks of the prior art. As such, the general purpose of the present invention, which will be described subsequently in greater detail, is to provide a new and improved floral carrier for truck bed which has all the advantages of the prior art mentioned heretofore and many novel features that result in a floral carrier for truck bed which is not anticipated, rendered obvious, suggested, or even implied by the prior art, either alone or in any combination thereof.

To attain this, the present invention essentially comprises a hollow truck bed cover having a front section, a rear section capable of rotating upward and towards the front section, multiple low profile bars along the tops of both sections, and a set of clips formed to interact with existing hardware in the bed of a pickup truck for mounting purposes.

There has thus been outlined, rather broadly, the more important features of the invention in order that the detailed description thereof that follows may be better understood and in order that the present contribution to the art may be better appreciated.

There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved floral carrier for truck bed that has all of the advantages of the prior art specialty truck bed accessories and none of the disadvantages.

It is another object of the present invention to provide a new and improved floral carrier for truck bed that may be easily and efficiently manufactured and marketed.

An even further object of the present invention is to provide a new and improved floral carrier for truck bed that has a low cost of manufacture with regard to both materials and labor, and which accordingly is then susceptible of low prices of sale to the consuming public, thereby making such a floral carrier for truck bed economically available to the buying public.

Still another object of the present invention is to provide a new floral carrier for truck bed that provides in the apparatuses and methods of the prior art some of the advantages thereof, while simultaneously overcoming some of the disadvantages normally associated therewith.

Even still another object of the present invention is to provide a floral carrier for a truck bed that provides a means for converting a conventional pickup truck into a floral car for funeral processions. This provides an enormous savings for the funeral home by avoiding the high cost of specialty floral cars.

Yet another object of the present invention is to provide a floral carrier for a truck bed that provides a protected storage area for potted plants or floral arrangements in a vase. This prevents damage to the interior of a hearse and to the casket due to plants tipping and spilling dirt and water.

Still another object of the present invention is to provide a floral carrier for a truck bed that provides mounting bars onto which floral arrangements can be attached. This allows floral arrangements from a funeral to be easily and attractively displayed on the vehicle for display in the funeral procession.

Even yet another object of the present invention is to provide a floral carrier for a truck bed that can be easily mounted on and removed from the bed of a pick up truck. This allows the user to easily and quickly mount or dismount the carrier and allows the carrier to be stored when not in use.

Lastly, it is an object of the present invention to provide a new and improved floral carrier for a pick up truck that has a hinged rear section. This allows the user to easily lift the rear section for quick and effortless access to the storage space formed beneath the cover.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
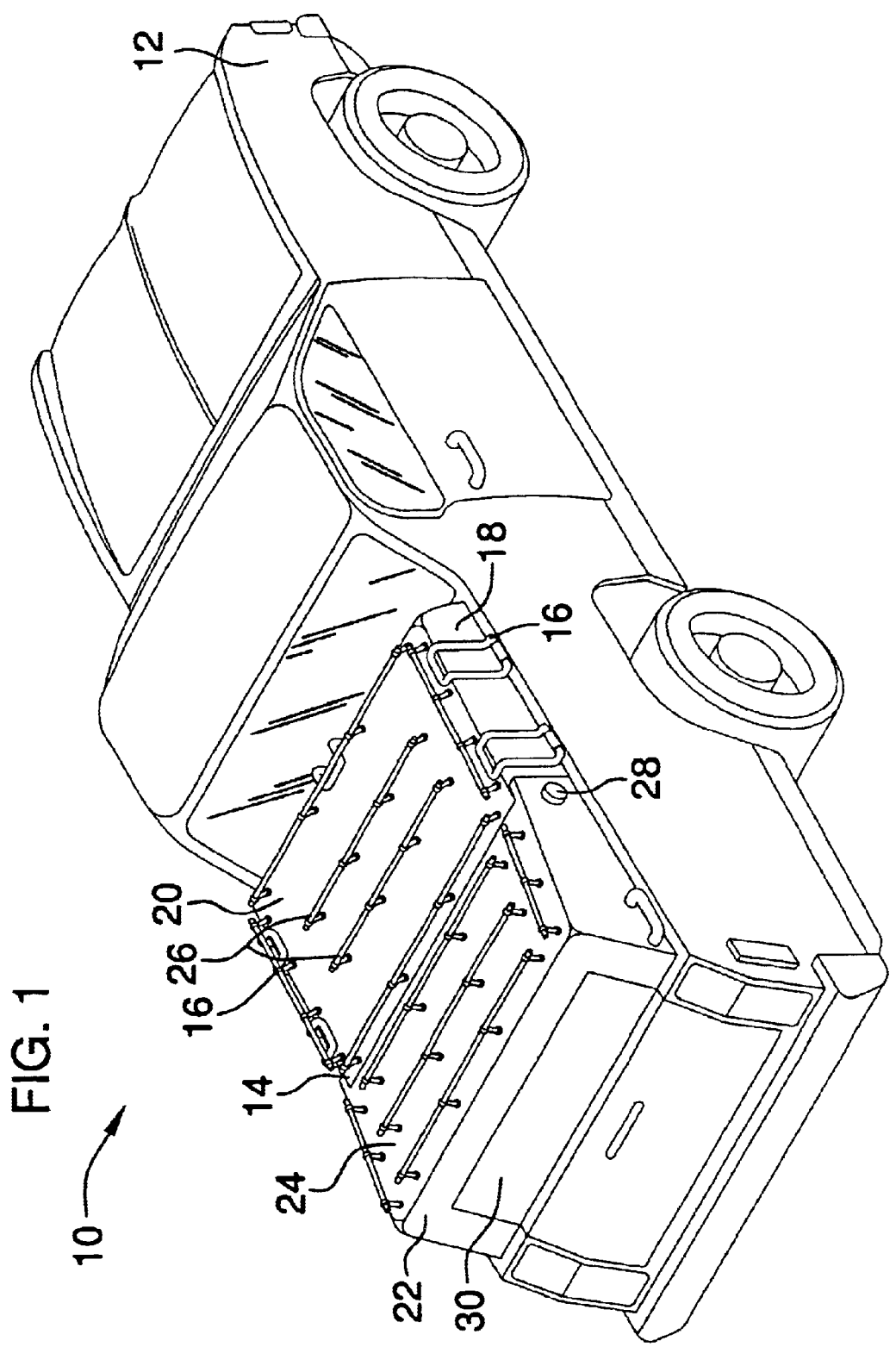
FIG. 1 is a right side perspective view of the preferred embodiment of the floral carrier for truck bed mounted in the bed of a pickup truck and constructed in accordance with the principles of the present invention.
Figure 2:
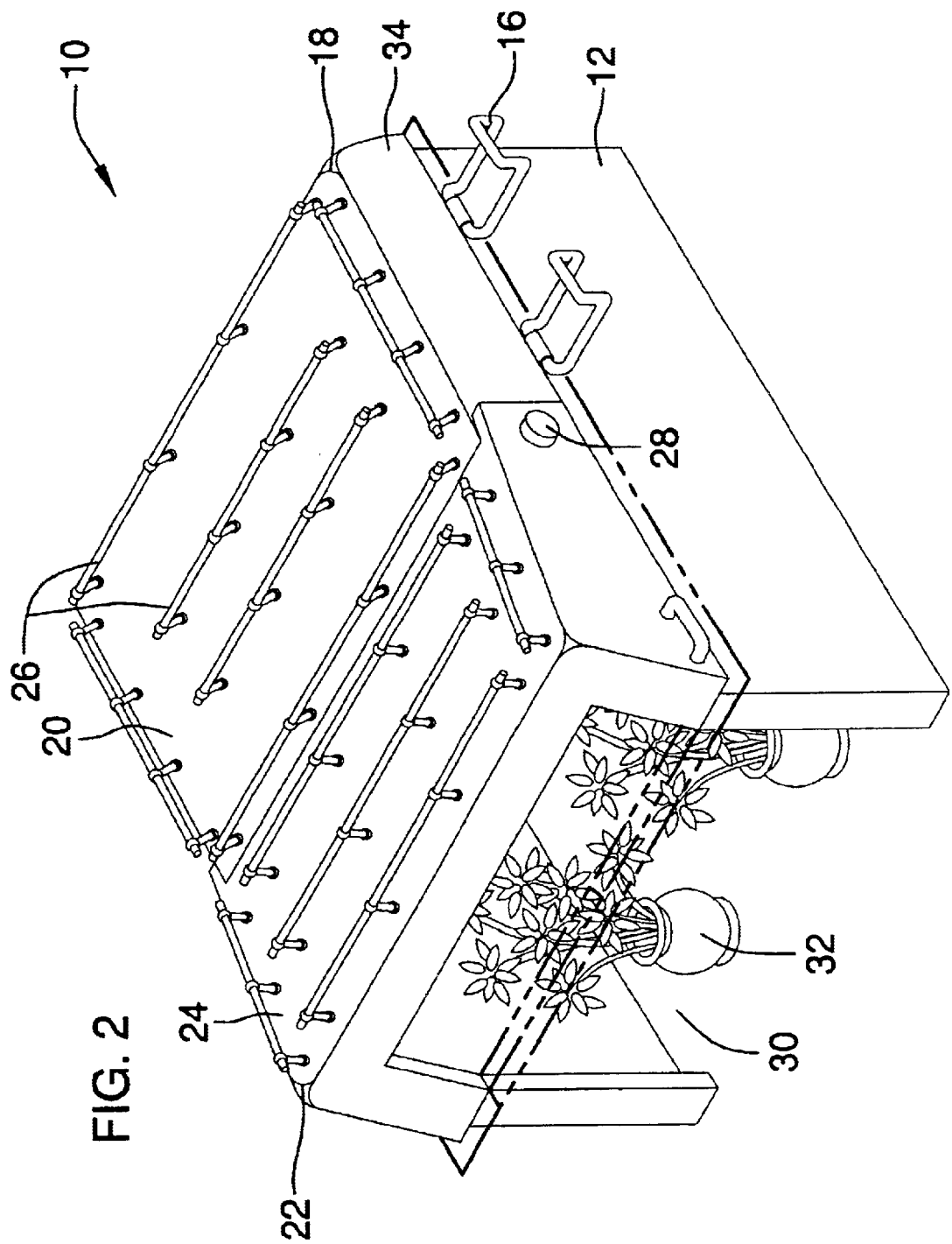
FIG. 2 is a right side perspective view of the floral carrier for truck bed of the present invention with the rear covering closed.
Figure 3:
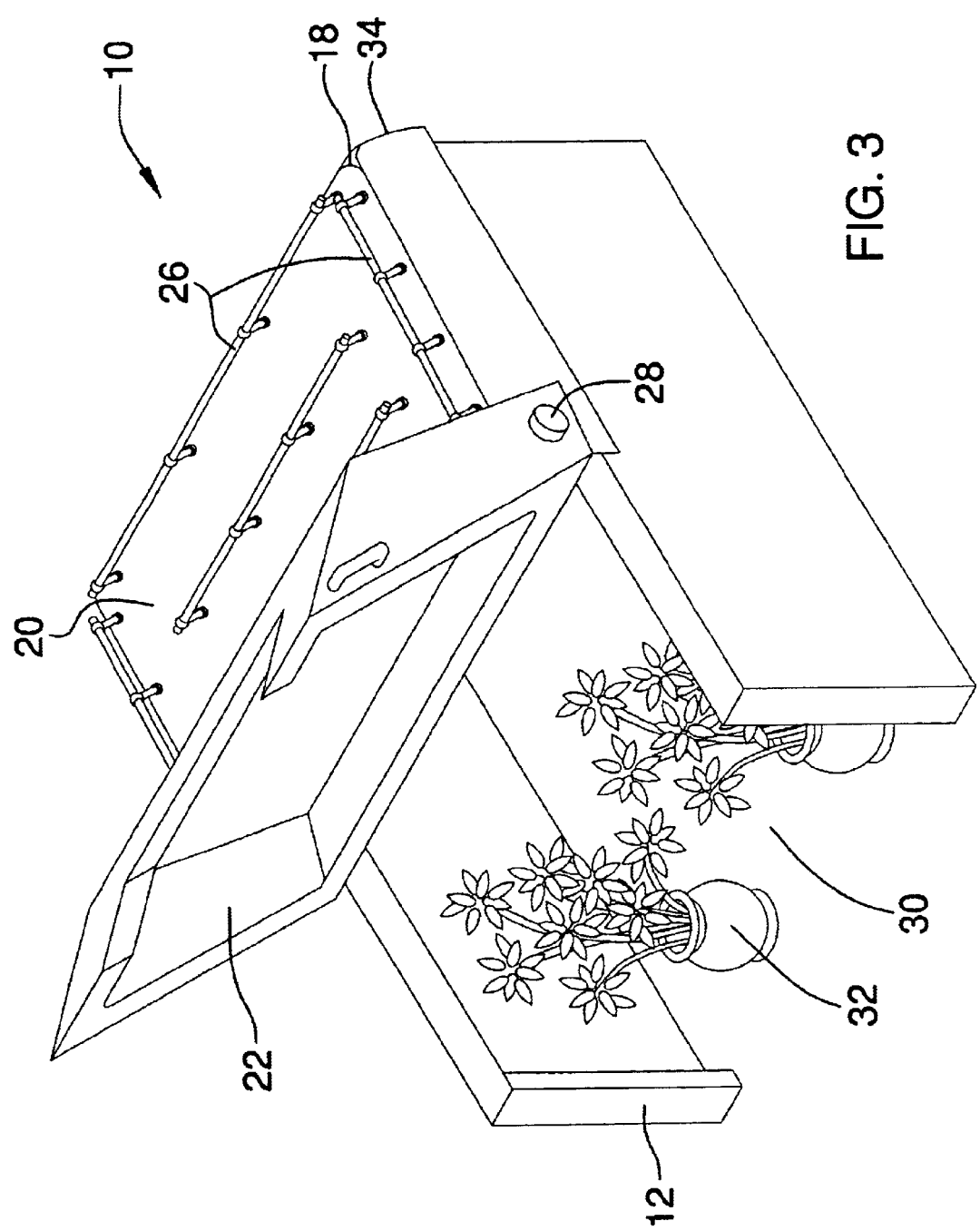
FIG. 3 is a right side perspective view of the floral carrier for truck bed of the present invention with the rear covering opened.

Referring now to the drawings, and particularly to FIGS. 1–3, a preferred embodiment of the floral carrier for truck bed of the present invention is shown and generally designated by the reference numeral 10.

In FIG. 1, a new and improved floral carrier for truck bed 10 of the present invention for providing a means for attractively displaying and safely transporting floral arrangements and potted plants is illustrated and will be described. More particularly, the floral carrier for truck bed 10 is shown mounted in the bed of a conventional pickup truck 12. The carrier 10 consists of a rectangular cover 14 that is secured to the truck 12 with a series of clips 16 on the front and the sides. The cover 14 has a front section 18 with a flat top 20 and a rear section 22 with an angled top 24 that extends rearward and upward from the front section 18. A series of bars 26 are located along the tops, 22 and 24, of the front and rear sections, 18 and 22, respectively, upon which floral arrangements could be attached to achieve an attractive display. The top 24 of the rear section 22 is capable of rotating upward along its front axis 28 to provide access to the storage area 30 below the cover 14.

FIGS. 2 and 3 show a right side perspective view of the floral carrier for a truck bed 10 dismounted from the pickup truck 12. In FIG. 2, the top 24 of the rear section 22 is closed to show the protective storage area 30 formed beneath the cover 14 and in which potted plants 32 or excessive floral arrangements could be safely stored. In FIG. 3, the top 24 of the rear section 22 is rotated upward on its front axis 28 to allow access to the storage area 30. This provides a convenient and easy to use flip-up top 24 on the rear section 22. A hand grip could extend from the front axis 28 for the user to grasp and turn when opening the top 24. Two locking clips 16, as are shown in FIG. 2, are connected to the bottom edge of the right side 34 of the front section 18, two clips 16 are connected to the left side of the front section 18, and one clip 16 is connected to the front of the front section 18. The bars 26 are placed around the outer edges of the tops, 22 and 24 and in a parallel fashion down the center of the tops, 22 and 24. The cover 14 would be made from a lightweight but durable plastic, which would allow the cover to be easily mounted or removed. The bars 26 would be made of polyvinylchloride (PVC) or a similar material.

In use, it can now be understood that a funeral home employee would mount the cover 14 on the bed of a pickup truck 12, securing it by latching the clips 16 to the truck bed. The employee would then open the rear section 22 of the cover 14 by flipping the top 24 upwards along its front axis 28 and place any potted plants 32 or excessive floral arrangements within the storage area 30. After closing the top 24, the employee would proceed to attach remaining floral arrangements to the bars 26 in an attractive and professional display. The truck 12 would then be driven in the procession from the funeral to the grave site. At the conclusion of the burial, or other service, the truck 12 would return to the funeral home where the cover 14 could be removed, by simply releasing the clips 16, and stored if desired.

While a preferred embodiment of the floral carrier for truck bed has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as metal, PVC, plastic, or a variety of wood may be used in the construction of the cover herein described. Also, the bars could be made of plastic, PVC, wood, metal, or similar material. And although providing a means for attractively displaying floral arrangements in a funeral procession has been described, it should be appreciated that the floral carrier for truck bed herein described is also suitable for providing a means for decoratively displaying flowers, signs, merchandise, or other items for a parade, mobile sales booth, or other outdoor occasions.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A floral carrier for truck bed comprising:
    a hollow cover having an approximately rectangular shape with a front section and a rear section, each with a top and right and left sides;
    a plurality of mounting clips connected to said sides of said cover;
    a plurality of bars connected to said tops of said front and said rear sections of said cover; and
    a hinge rotatably connecting said top of said rear section of said cover with said top of said front section of said cover;
    wherein said rear section of said cover has a rectangular rear panel with a top edge, a right edge perpendicular to said top edge, a left edge parallel to said right edge, and bottom edge formed with a substantial rectangular opening in its center.

2. A floral carrier for truck bed comprising:

a hollow rectangular front cover having a horizontal top with a front edge and a rear edge, a right panel perpendicular to said top, a left panel parallel to said right panel, and an open bottom;

a hinge connected to said rear edge of said top of said front cover;

a rear cover having a top, a right panel, a left panel parallel to said right panel, and a rectangular rear panel with a top edge, a right edge, a left edge, and a bottom edge and formed with a substantial rectangular opening in said rear panel, said rear cover extending rearward from said hinge and said rear edge of said top of said front cover;

a hand grip extending from said right panel of said rear cover;

a plurality of elongated bars connected to said tops of said front and said rear covers with a plurality of fasteners; and a plurality of clips connected to said front cover.

3. The floral carrier for truck bed of claim 2 wherein said right and said left panels of said rear cover have a horizontal bottom edge, a right and a left edge perpendicular to said bottom edge, and a top edge that angles rearward and upward wherein said top of said rear cover extends rearward and slightly upward of said top of said front cover.

4. The floral carrier for truck bed of claim 2 wherein said hinge allows said rear cover to rotate upward and towards said front cover.

5. The floral carrier for truck bed of claim 4 wherein said hand grip allows a user to facilitate the upward rotation of said rear cover along said hinge.

6. The floral carrier for truck bed of claim 4 wherein said top of said rear cover extends from said top of said front cover and said hinge is formed as a creased section between said tops of said rear and said front covers.

7. The floral carrier for truck bed of claim 2 wherein said clips are adapted for attachment to existing hardware in the bed of a pick up truck and are placed on said front cover to coincide with said hardware of said pick up truck.

8. The floral carrier for truck bed of claim 2 wherein said carrier is sized to fit over the bed of a pick up truck with said right and said left panels of said front and said rear covers of said carrier flush with or slightly overlapping the sides of said bed of said pick up truck.

9. The floral carrier for truck bed of claim 2 wherein said fasteners are perpendicular to said bars and are dimensioned to keep said bars in close proximity of said tops of said front and said rear covers.

10. The floral carrier for truck bed of claim 2 wherein said bars are comprised of PVC pipe.

\* \* \* \* \*